May 23, 1961 G. LUNDGREN 2,984,957
PLANT FOR COLLECTING RUBBISH FROM RUBBISH-CHUTES
IN OPEN CONTAINERS
Filed May 11, 1959 4 Sheets-Sheet 1

INVENTOR
GUNNAR LUNDGREN
BY
ATTORNEY

INVENTOR
GUNNAR LUNDGREN
BY Peter M. Cross
ATTORNEY

United States Patent Office 2,984,957
Patented May 23, 1961

2,984,957

PLANT FOR COLLECTING RUBBISH FROM RUBBISH-CHUTES IN OPEN CONTAINERS

Gunnar Lundgren, Huvudstagatan 15, Solna, Sweden

Filed May 11, 1959, Ser. No. 812,270

6 Claims. (Cl. 53—124)

This invention relates to a plant for collecting rubbish, which is dropped through a chute in a house, in one or more open containers. The chief object of the invention is to increase the receiving capability of the available rubbish containers, facilitate the handling of the rubbish and prolong the intervals between its removal, and to provide possibilities for automatic exchange of containers as soon as a container is filled.

The plant according to the invention is mainly characterized by the provision of means for repeatedly compressing the contents of each rubbish container during its filling. Such a compression increases the receiving capability of each container to a very high extent— sometimes up to ten times its capability of receiving loose rubbish.

In a prefered embodiment the device for compressing the rubbish in the container or containers comprises a press head operated by compressed air or some other suitable pressure medium and adapted to be pressed from above into the container with predetermined strength.

The rubbish containers may have the shape of truncated cones, which is the form hitherto normally used, or they may be entirely cylindrical drums. They are preferably provided with a lining in the form of a paper bag and may have a portion of the envelope wall adapted to be swung aside to facilitate removal of the bag after filling.

During compression of the contents of the container the chute must of course be closed. This can be done in many ways, for instance by means of shutters, swing covers or the like.

Further features of the invention will appear from the following description of an embodiment of a plant intended for a larger apartment house or the like, reference being had therein to the accompanying, partly diagrammatic drawings, in which—

Figure 1:
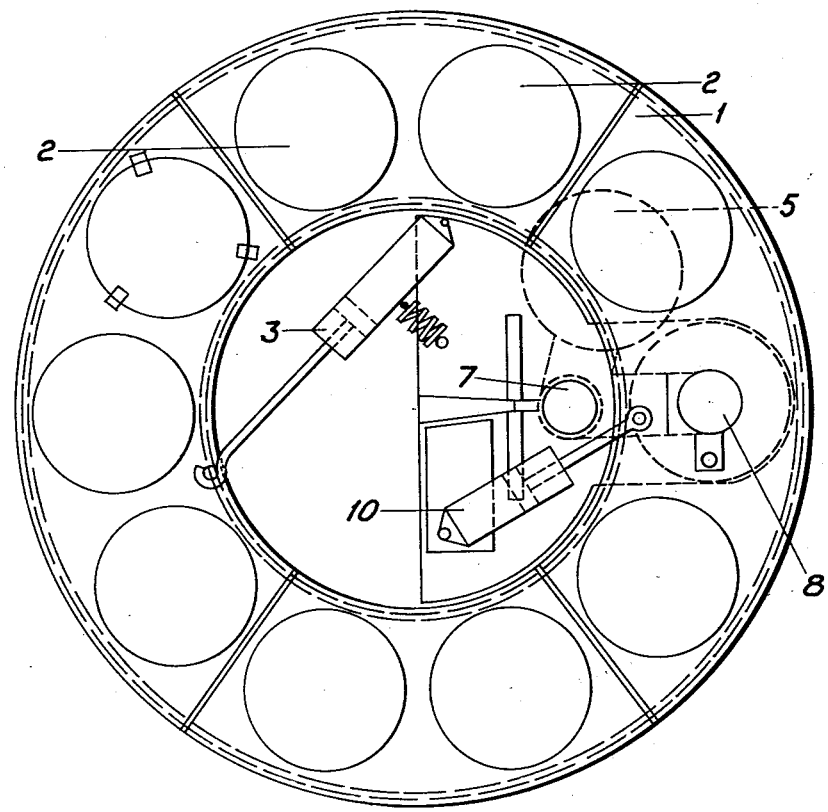
Figure 2:
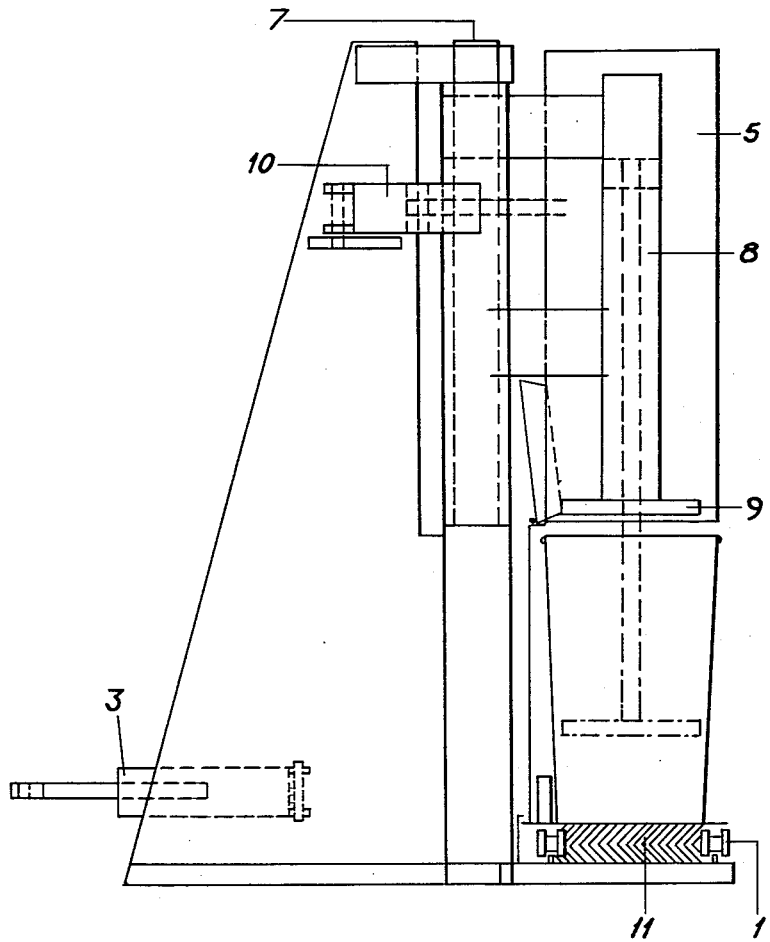
Figure 3:
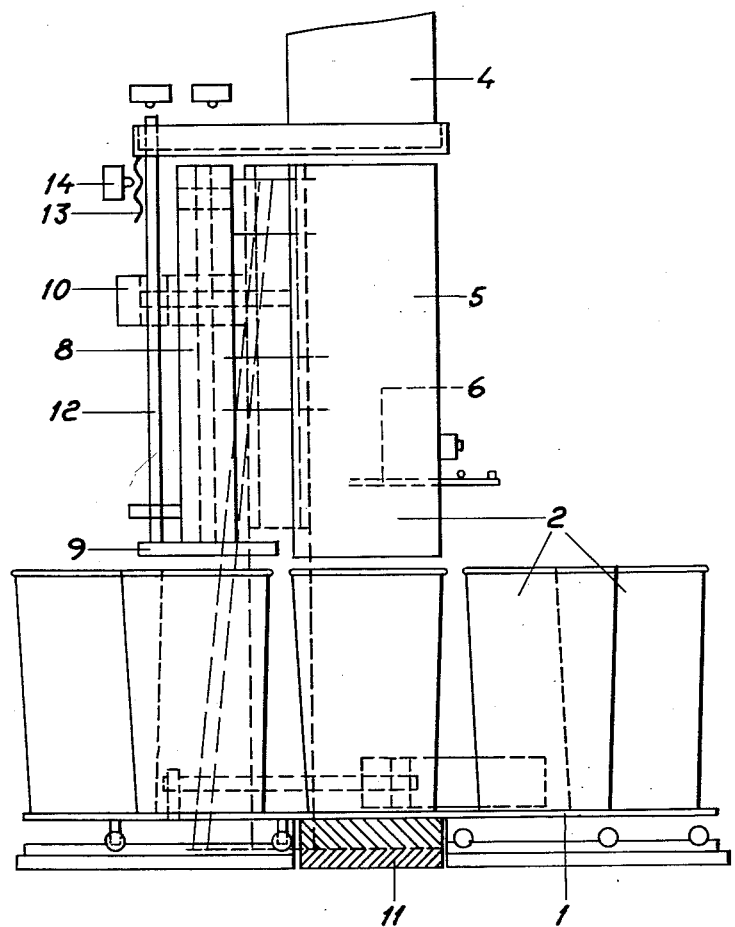
Figure 4:
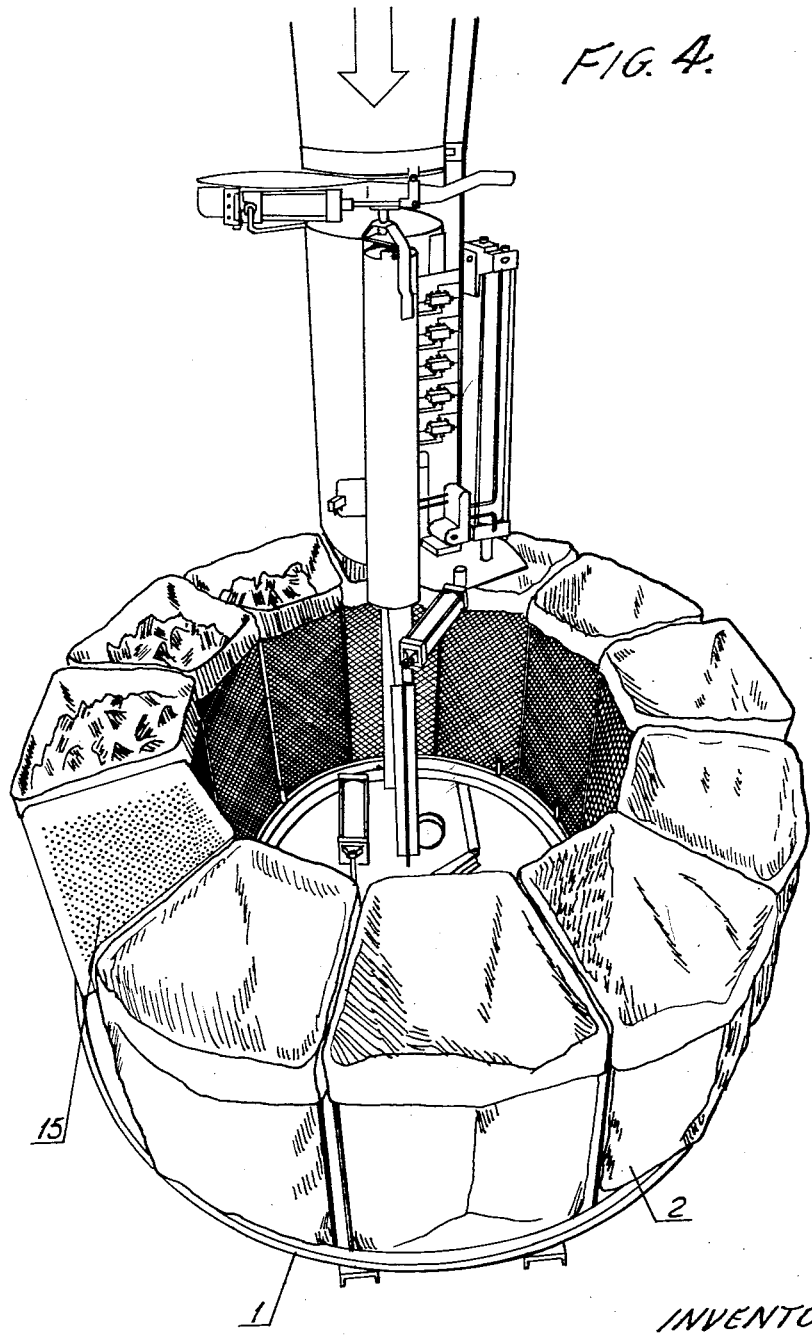

Fig. 1 is a plan view,
Fig. 2 is a partial section,
Fig. 3 is a side elevation, and
Fig. 4 is a perspective view of the plant.

As most clearly seen from Fig. 1, the plant consists of a rotary stage or stage-like carriage 1, which carries a plurality of open rubbish containers 2 and is stepwise turnable about its centre by means of a pneumatic driving device generally designated by 3. This arrangement will bring the containers one by one under the mouth of a chute 4 (Fig. 3), through which the rubbish is dropped. Of course the containers 2 may also be arranged in a row or in some other suitable way to be pushed, each in its turn, under the mouth of the chute 4 by a feeding mechanism.

Under the lower mouth of the chute 4 is normally located a drum 5 with open ends. This drum forms an extension of the chute 4 and carries the dropping rubbish into the container 2 that is at the moment to be filled. In the drum 5 is provided a rocker bracket or some other feeling means 6, which is actuated by the falling rubbish. Compression of the contents of the container at the moment under filling will take place when this feeler has received a predetermined number of impulses.

For compression of the rubbish, the drum 5 is swingably journalled via arms to a pillar 7, so that it can be swung aside and simultaneously pull a cover (not shown) before the lower mouth of the chute 4. With the drum 5 is combined a compressing device comprising a pneumatic cylinder 8 with a piston rod whose lower end carries a press head 9. This compressing device partakes in the movement of the drum 5, so that when the latter is swung aside, the compressing device is brought in position right above the rubbish container momentarily under filling, as shown in Fig. 2. The swinging movement is caused by a pneumatic driving device 10, to which compressed air is fed via a valve controlled by the feeler 6.

When the press head is situated right above the container momentarily under filling, another valve (not shown) enters into action and feeds compressed air to the pneumatic cylinder 8, whereby the press head 9 is pressed into the container from above with a certain, predetermined strength. A time relay (not shown) causes in known manner a withdrawal of the press head 9 after a short time, whereafter the compressing device is restored to its original, inoperative position, the drum 5 simultaneously being swung into position to connect the lower mouth of the chute with the upper mouth of the container. The plant is now ready for use again and the partly filled container can receive further rubbish. The compressing operation lasts only a fraction of a minute. The container to be filled, whose contents are thus to be compressed at certain intervals, should preferably rest on a felt plate 11 or some other resilient material to avoid unnecessary noise during compression.

If the container 2 is filled, the press head 9 can of course be pressed down only a very short distance in the container. To control the compressing device the press head 9 is provided with a rod 12, which is movable outside the cylinder 8 and actuates, through a cam 13, a feeler 14 as soon as the press head 9 has moved downwards by a predetermined minimum distance. If the cam 13 does not actuate the feeler 14 during the compressing operation, the above described cycle is changed in such a way that the compressing device remains in its operative position above the container, although the press head 9 is withdrawn to its highest position, until the driving device 3 has placed a new container straight below the lower mouth of the chute 4. Only then the drum 5 can be swung in position under the chute again and the plant be considered ready to receive further rubbish.

Fig. 4 is a perspective view of a plant tried in practical use. Here, the platform 1 carries a number of outwards and upwards opening pockets 15 made of perforated sheet metal. To save room, the cross seceion of the pockets has the form of a circle sector with the pointed portion cut away. The rubbish containers are in this case paper bags, whose upper edges are folded over the top rim of the pockets as shown in the drawing. When a bag has been filled and pushed away from below the chute, its edges are loosened from the pocket and folded towards each other and the bag is closed. This closing may be done automatically and mechanically. The closed back can then easily be taken out of the pocket for removal.

To allow compressing under high pressure, a rigid shield should be provided near the platform, in the place where the compressing takes place, to form the fourth side of the pocket momentarily located in this place.

Of course the plant can be arranged for any number of rubbish containers, and the compressing procedure described can be effected also when a single container is used. It should also be understood that the invention is not confined to the embodiment described above and illustrated in the drawings, as it will be obvious to any man skilled in the art that a plurality of modifications are thinkable without abandonment of the inventional spirit.

I claim:

1. In a plant for collecting rubbish in open containers, a chute through which rubbish is dropped from an elevated location, a platform having containers arranged thereon, a container feeding device for turning said platform step by step, a power unit, a press head driven by said unit, said press head being adapted to repeatedly compress the contents of each rubbish container during its filling, said power unit and press head being swingable in a horizontal plane between an inoperative position at the side of the container and an operative position right above the container.

2. Plant as claimed in claim 1, characterized in that the operating mechanism of said press head is connected with a separate lower portion of said chute, said lower portion thus partaking in the swinging movement of said press head.

3. Plant as claimed in claim 1 characterized by the provision of means for closing the lower mouth of said chute during the compressing procedure.

4. Plant as claimed in claim 1, characterized in that said press head is adapted to serve also as a feeling means for feeling the degree of filling of the rubbish container and actuating said container feeding device so that an empty container is brought in position under the chute when the foregoing container is filled.

5. Plant as claimed in claim 1, characterized in that said platform carries a number of outwards and upwards open pockets, whose cross section has the form of a circle sector with a pointed portion cut away, and over the upper rim of which the upper edges of paper bags constituting the rubbish containers can be folded so that the paper bags are hanging detachably in the pockets.

6. Plant as claimed in claim 5, characterized in that a rigid shield is provided near said platform in the place where the compressing takes place, so as to form the fourth side of the pocket momentarily located in this place for filling and compression.

References Cited in the file of this patent

UNITED STATES PATENTS

| | | |
|---|---|---|
| 312,968 | Carey | Feb. 24, 1885 |
| 1,311,955 | Edison | Aug. 5, 1919 |
| 1,404,135 | Myers | Jan. 17, 1922 |
| 2,798,348 | Weber et al. | July 9, 1957 |